United States Patent
Fitzgerald

(10) Patent No.: US 9,179,789 B1
(45) Date of Patent: Nov. 10, 2015

(54) COLLAPSIBLE AND WALL MOUNTABLE PERSONAL TRANSPORTATION VEHICLE STORAGE SYSTEM

(71) Applicant: Darryl Fitzgerald, Beacon Falls, CT (US)

(72) Inventor: Darryl Fitzgerald, Beacon Falls, CT (US)

(*) Notice: Subject to any disclaimer, the term of this patent is extended or adjusted under 35 U.S.C. 154(b) by 0 days.

(21) Appl. No.: 14/217,781

(22) Filed: Mar. 18, 2014

(51) Int. Cl.
*A47F 7/00* (2006.01)
*A47F 5/08* (2006.01)
*B62H 3/12* (2006.01)

(52) U.S. Cl.
CPC ... *A47F 5/08* (2013.01); *A47F 7/00* (2013.01); *B62H 3/12* (2013.01)

(58) Field of Classification Search
CPC ....... A47F 5/04; A47F 5/0807; A47F 5/0876; A47F 7/24; A47F 7/26; A47F 5/08; A47F 7/00; B62H 3/04; B62H 1/02; B62H 1/06; B62H 3/12; A47G 25/0685; A47G 25/746; A47G 25/0664; A47G 25/06; A47B 61/04; A47B 61/02; D06F 57/12; D06F 57/04
USPC ........... 211/18, 21, 85.7, 104, 87.01, 100, 96, 211/111, 171, 193, 106.1, 90.01, 195; 248/682, 447, 200, 240.4, 235, 304, 248/38, 309.1, 323
See application file for complete search history.

(56) References Cited

U.S. PATENT DOCUMENTS

| | | | | |
|---|---|---|---|---|
| 2,931,513 A | * | 4/1960 | Cignoli | 211/35 |
| 3,484,069 A | * | 12/1969 | Larson | 248/220.42 |
| 3,976,200 A | * | 8/1976 | Munns | 211/18 |
| D241,391 S | | 9/1976 | Weisenfeld et al. | |
| 4,003,315 A | * | 1/1977 | Barth | 104/93 |
| 4,188,890 A | * | 2/1980 | de Villers | 108/30 |
| 4,552,270 A | * | 11/1985 | Lentz et al. | 211/17 |
| 4,583,646 A | * | 4/1986 | Bowman | 211/32 |
| 5,054,628 A | * | 10/1991 | Allen | 211/104 |
| 5,492,228 A | * | 2/1996 | Botkin | 211/85.7 |
| 5,897,002 A | | 4/1999 | Carlino | |
| 5,927,519 A | * | 7/1999 | Koonts et al. | 211/85.7 |
| 6,003,688 A | * | 12/1999 | Steidle | 211/41.11 |
| D421,082 S | | 2/2000 | Lopez | |
| 6,164,465 A | * | 12/2000 | Schroeder | 211/85.7 |
| 6,293,412 B1 | | 9/2001 | Draper | |
| D469,294 S | | 1/2003 | Harms et al. | |
| D472,091 S | | 3/2003 | Bell | |
| 6,640,978 B2 | | 11/2003 | Reiser et al. | |
| 7,014,053 B2 | | 3/2006 | Calleja | |
| 7,546,990 B1 | * | 6/2009 | McGuire | 248/111 |
| 8,061,789 B2 | * | 11/2011 | Krueger | 312/248 |
| 2003/0029820 A1 | * | 2/2003 | Heneveld, Sr. | 211/87.01 |
| 2007/0068887 A1 | * | 3/2007 | Nawrocki | 211/70.6 |

* cited by examiner

Primary Examiner — Jennifer E Novosad

(57) ABSTRACT

A collapsible wall mountable personal transportation vehicle storage system for conveniently storing a plurality of personal transportation vehicles of different types features a personal transportation vehicle. The system features a rigid planar base mounted to a vertical surface via hardware through recessed mounting apertures. The system features a u-shaped upper bracket and a u-shaped lower bracket pivotally mounted to a base front surface. The bracket features a first leg extension and a second leg extension perpendicularly located on opposing ends of a leg crossbeam. The system features a linear peg stand located on both the first leg extension and the second leg extension. The peg stand is designed to interface with the base front surface to support the bracket. The bracket is designed to pivot upwardly to a position flush with the base front surface and downwardly to a position perpendicular with the base front surface.

9 Claims, 3 Drawing Sheets

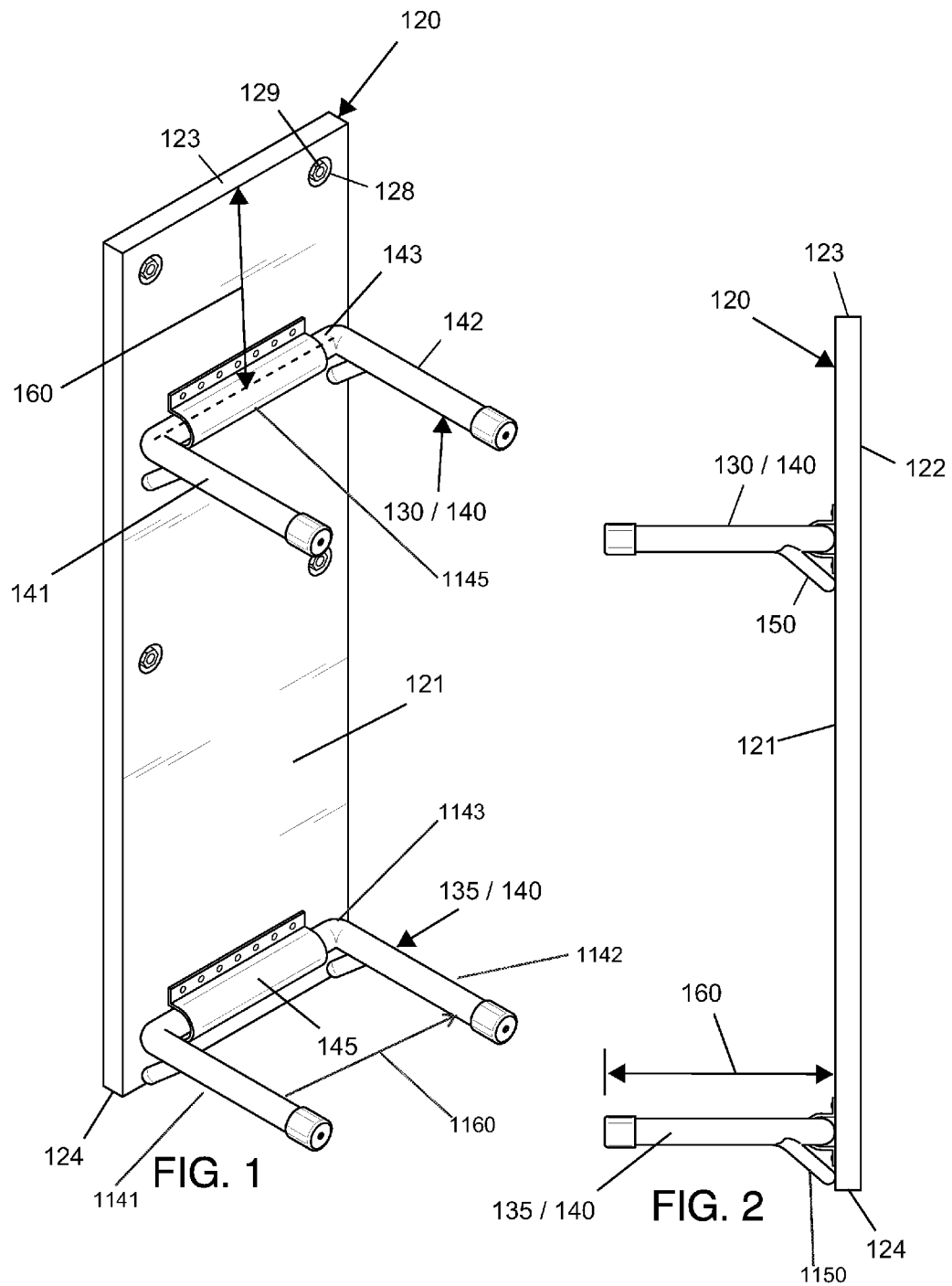

COLLAPSIBLE AND WALL MOUNTABLE PERSONAL TRANSPORTATION VEHICLE STORAGE SYSTEM

FIELD OF THE INVENTION

The present invention relates to personal transportation vehicle storage systems.

BACKGROUND OF THE INVENTION

Personal transportation vehicles have been popular for many years and include a wide variety of devices. Often more than one of these types of vehicles is owned by a single person or family. A need exists to help organize multiple vehicles to keep them stored in an organized manner. The present invention a collapsible wall mountable personal transportation vehicle storage system for conveniently storing a plurality of personal transportation vehicles of different types.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention a collapsible wall mountable personal transportation vehicle storage system for conveniently storing a plurality of personal transportation vehicles of different types. In some embodiments, the system comprises a personal transportation vehicle.

In some embodiments, the system comprises a rigid planar base. In some embodiments, a plurality of recessed mounting apertures is located in the base. In some embodiments, a base rear surface is located against and mounted to a vertical surface via hardware through the recessed mounting apertures.

In some embodiments, the system comprises a u-shaped upper bracket pivotally mounted to a base front surface, and a u-shaped lower bracket pivotally mounted to the base front surface. In some embodiments, each bracket comprises a first leg extension and a second leg extension perpendicularly located on opposing ends of a leg crossbeam. In some embodiments, the leg crossbeam is located against the base front surface via a bracket.

In some embodiments, the system comprises a linear peg stand located on both the first leg extension and the second leg extension of the bracket at a peg stand angle. In some embodiments, the peg stand is designed to interface with the base front surface to support the bracket. In some embodiments, the bracket is designed to pivot upwardly to a position flush with the base front surface. In some embodiments, the bracket is designed to pivot downwardly to a position perpendicular with the base front surface. In some embodiments, the system collapses when not in use.

BRIEF DESCRIPTION OF THE DRAWINGS

FIG. 1 shows a perspective view of the base of the present invention.

FIG. 2 shows a side view of the base of the present invention.

DESCRIPTION OF PREFERRED EMBODIMENTS

Figure 3:
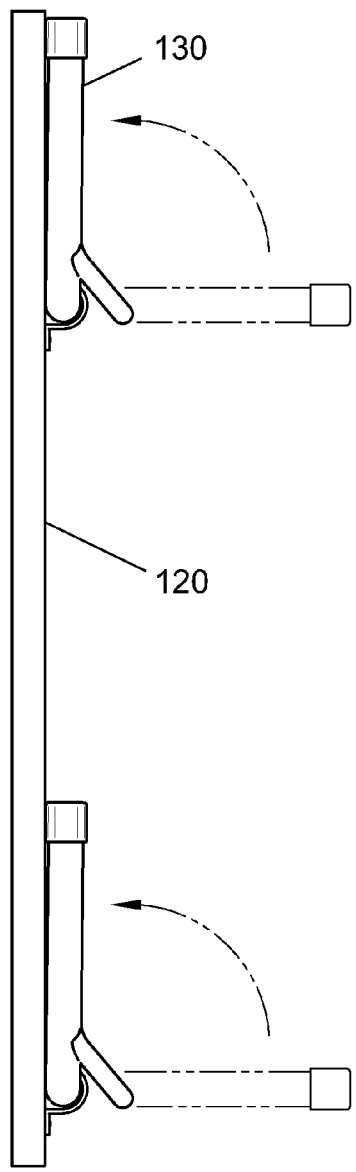
FIG. 3 shows a side view of the base of the present invention featuring collapsible brackets.
Figure 4:
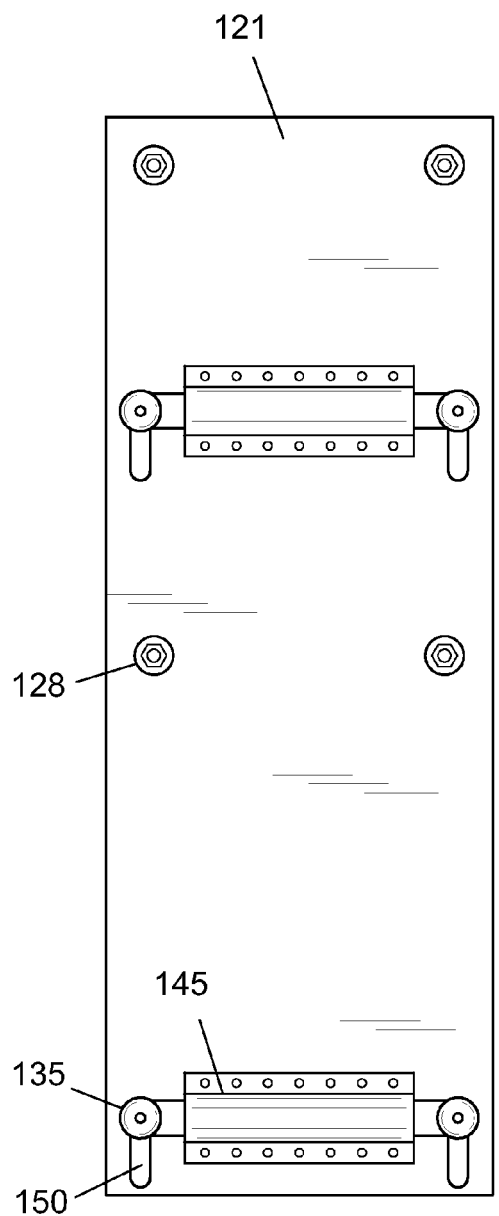
FIG. 4 shows a front view of the base of the present invention.
Figure 5:
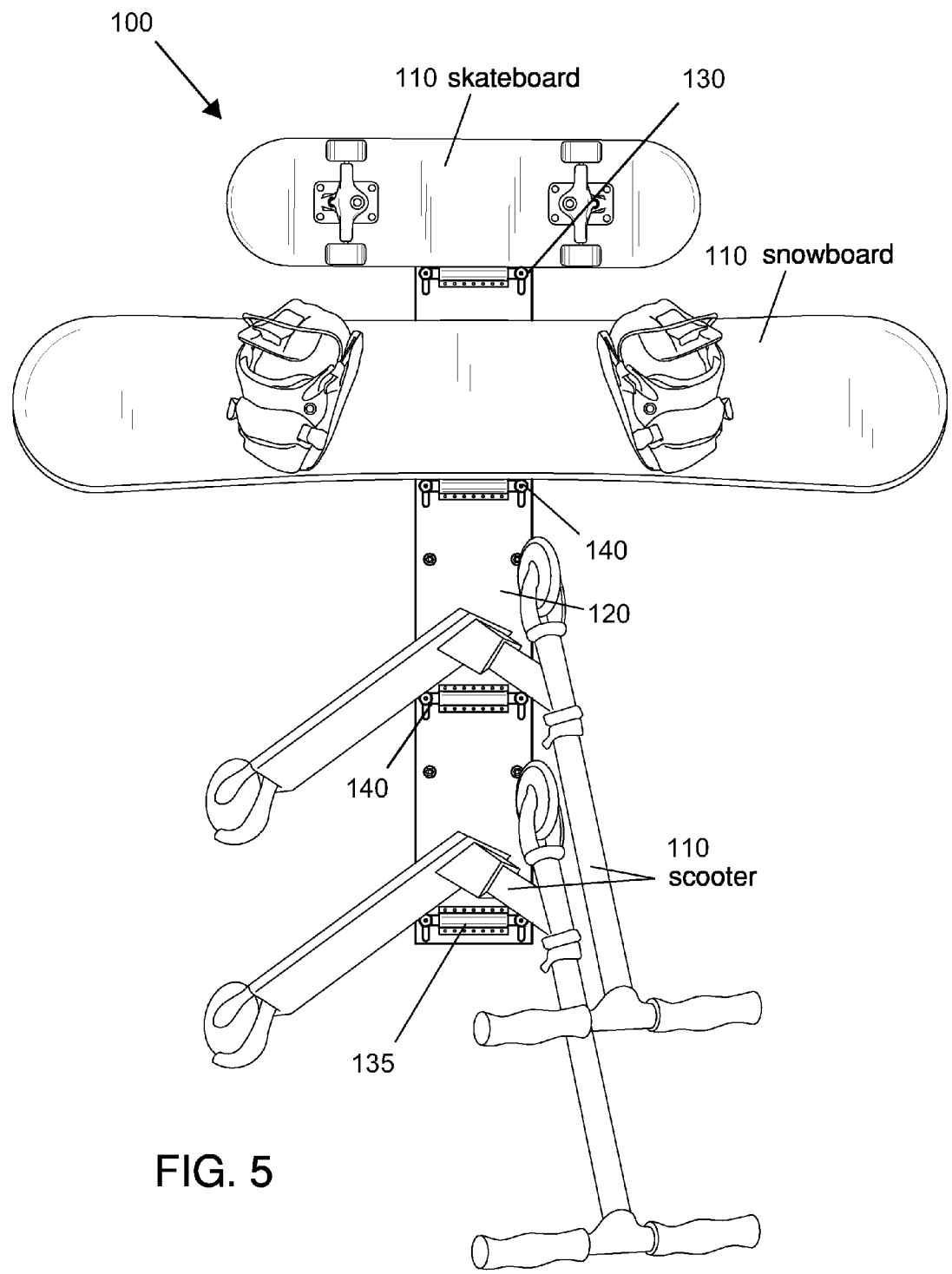
FIG. 5 shows a front view of the present invention in use featuring a variety of vehicles stored thereon.

Following is a list of elements corresponding to a particular element referred to herein:

- 100 Vehicle storage system
- 110 Vehicle
- 120 Base
- 121 Base front surface
- 122 Base rear surface
- 123 Base top edge
- 124 Base bottom edge
- 128 Aperture
- 129 Hardware
- 130 Upper bracket
- 135 Lower bracket
- 140 Bracket
- 141 First leg extension
- 142 Second leg extension
- 143 Leg crossbeam
- 145 Mount
- 150 Peg stand
- 160 Leg extension length Referring now to FIG. 1-5, the present invention features a collapsible wall mountable personal transportation vehicle storage system (100) for conveniently storing a plurality of personal transportation vehicles of different types. In some embodiments, the system (100) comprises a personal transportation vehicle (110).

In some embodiments, the system (100) comprises a rigid planar base (120) having a base front surface (121), a base rear surface (122), a base top edge (123), and a base bottom edge (124). In some embodiments, a plurality of recessed mounting apertures (128) is located in the base (120) from the base front surface (121) to the base rear surface (122). In some embodiments, the base rear surface (122) is located against and mounted to a vertical surface via hardware (129) located through the recessed mounting apertures (128). In some embodiments, the hardware (129) can be, but is not limited to screws, nails, bolts, nuts, or other fasteners.

In some embodiments, the system (100) comprises a u-shaped upper bracket (130) pivotally mounted to the base front surface (121), and a u-shaped lower bracket (135) pivotally mounted to the base front surface (121). In some embodiments, the upper bracket (130) and the lower bracket (135) are herein collectively known as a bracket (140). In some embodiments, the bracket (140) comprises a first leg extension (141) and a second leg extension (142) perpendicularly located on opposing ends of a leg crossbeam (143) parallel to each other and facing the same direction. In some embodiments, the leg crossbeam (143) is rotatingly located against the base front surface (121) via a mount (145). In some embodiments, a first leg extension length is equal to a second leg extension length and is herein collectively known as a leg extension length (160). In some embodiments, the upper bracket (130) is located at an offset from the base top edge (123) a length equal to the leg extension length (160). In some embodiments, the lower bracket (135) is located an offset from the upper bracket (130) at least the length equal to the leg extension length (160). In some embodiments, the leg crossbeam (143) is located parallel to the base top edge (123) and the base bottom edge (124).

In some embodiments, the leg extension length (160) is 4 inches. In some embodiments, the leg extension length (160) is less than 4 inches. In some embodiments, the leg extension length (160) is 4-6 inches. In some embodiments, the leg extension length (160) is 6-8 inches. In some embodiments, the leg extension length (160) is 8-12 inches. In some embodiments, the leg extension length (160) is greater than 12 inches.

In some embodiments, the first leg extension (141) and the second leg extension (142) are 4 inches apart from centerline to centerline. In some embodiments, the first leg extension (141) and the second leg extension (142) are 2-3 inches apart from centerline to centerline. In some embodiments, the first leg extension (141) and the second leg extension (142) are 5-6 inches apart from centerline to centerline. In some embodiments, the first leg extension (141) and the second leg extension (142) are 6-8 inches apart from centerline to centerline. In some embodiments, the first leg extension (141) and the second leg extension (142) are greater than inches apart from centerline to centerline.

In some embodiments, the system (100) comprises a linear peg stand (150) located on both the first leg extension (141) and the second leg extension (142) of the bracket (140) at a peg stand angle. In some embodiments, the peg stand (150) is designed to interface with the base front surface (121) to support the bracket (140). In some embodiments, the bracket (140) is designed to pivot upwardly to a position flush with the base front surface (121). In some embodiments, the bracket (140) is designed to pivot downwardly to a position perpendicular with the base front surface (121). In some embodiments, the system (100) collapses when not in use.

In some embodiments, the collapsible wall mountable personal transportation vehicle storage system (100) is for conveniently storing a plurality of personal transportation vehicles of different types. In some embodiments, the personal transportation vehicle (110) is a skateboard. In some embodiments, the personal transportation vehicle (110) is a longboard. In some embodiments, the personal transportation vehicle (110) is a surfboard. In some embodiments, the personal transportation vehicle (110) is a snowboard. In some embodiments, the personal transportation vehicle (110) is a scooter. In some embodiments, the personal transportation vehicle (110) is a bicycle. In some embodiments, the personal transportation vehicle (110) is a moped.

In some embodiments, the system (100) further comprises one or more additional u-shaped brackets (140) pivotally mounted to the base front surface (121). In some embodiments, one or more additional brackets (140) are located between the upper bracket (130) and the lower bracket (135).

In some embodiments, each bracket (140) is located 10 inches from another bracket (140) on the base (120).

In some embodiments, two different types of personal transportation vehicles (110) are disposed on the brackets (140) of the system (100). In some embodiments, three different types of personal transportation vehicles (110) are disposed on the brackets (140) of the system (100).

As used herein, the term "about" refers to plus or minus 10% of the referenced number.

The disclosures of the following U.S. Patents are incorporated in their entirety by reference herein: U.S. Pat. No. D 472,091; U.S. Pat. No. D 469,294; U.S. Pat. No. D 421,082; U.S. Pat. No. D 241,391; U.S. Pat. No. 7,014,053; U.S. Pat. No. 6,640,978; U.S. Pat. No. 6,293,412; and U.S. Pat. No. 5,897,002.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A collapsible wall mountable personal transportation vehicle storage system (100) for storing a plurality of personal transportation vehicles of different types, wherein the system (100) comprises:

(a) a personal transportation vehicle (110);

(b) a rigid planar base (120) having a base front surface (121), a base rear surface (122), a base top edge (123), and a base bottom edge (124), wherein a plurality of recessed mounting apertures (128) are disposed in the base (120) from the base front surface (121) through the base rear surface (122), wherein the base rear surface (122) is adapted to be disposed and mounted to a vertical surface via hardware (129) disposed through the recessed mounting apertures (128);

(c) a u-shaped upper bracket (130) pivotally mounted to the base front surface (121), wherein the upper bracket (130), comprises a first leg extension (141) and a second leg extension (142) perpendicularly disposed on opposing ends of a upper leg crossbeam (143), wherein the upper leg crossbeam (143) is rotatingly disposed against the base front surface (121) via an upper mount (1145), wherein a first leg extension length (160) is equal to a second leg extension length (160), wherein the upper bracket (130) is disposed at an offset from the base top edge (123) a length equal to the first and second leg extension length (160), wherein the upper leg crossbeam (143) is disposed parallel to the base top edge (123) and the base bottom edge (124);

(d) a linear upper peg stand (150) disposed on both the first leg extension (141) and the second leg extension (142) of the upper bracket (130) at a peg stand angle, wherein the upper peg stand (150) is pushed on the base front surface (121) to support the upper bracket (130), wherein the upper bracket (130) is designed to pivot upwardly to a position flush with the base front surface (121), wherein the upper bracket (130) is designed to pivot downwardly to a position perpendicular with the base front surface (121);

(e) a u-shaped lower bracket (135) pivotally mounted to the base front surface (121), wherein the lower bracket (135) comprises a first leg extension (1141) and a second leg extension (1142) perpendicularly disposed on opposing ends of a lower leg crossbeam (1143), wherein the lower leg crossbeam (1143) is rotatingly disposed against the base front surface (121) via a lower mount (145), wherein a first leg extension length (1160) is equal to a second leg extension length (1160), wherein the lower bracket (135) is disposed an offset from the upper bracket (130) at least the length equal to the leg extension length (1160), wherein the lower leg crossbeam (1143) is disposed parallel to the base top edge (123) and the base bottom edge (124);

(f) a linear lower peg stand (1150) disposed on both the first leg extension (1141) and the second leg extension (1142) of the lower bracket (135) at a peg stand angle, wherein the lower peg stand (1150) is pushed on the base front surface (121) to support the lower bracket (135), wherein the lower bracket (135) is designed to pivot upwardly to a position flush with the base front surface (121), wherein the lower bracket (135) is designed to pivot downwardly to a position perpendicular with the base front surface (121).

2. The system (100) of claim 1, wherein the personal transportation vehicle (110) is a skateboard.

3. The system (100) of claim 1, wherein the personal transportation vehicle (110) is a longboard.

4. The system (100) of claim 1, wherein the personal transportation vehicle (110) is a surfboard.

5. The system (100) of claim 1, wherein the personal transportation vehicle (110) is a snowboard.

6. The system (100) of claim 1, wherein the personal transportation vehicle (110) is a scooter.

7. The system (100) of claim 1, wherein the personal transportation vehicle (110) is a bicycle.

8. The system (100) of claim 1, wherein the personal transportation vehicle (110) is a moped.

9. The system (100) of claim 1, wherein the system (100) further comprises one or more additional u-shaped brackets pivotally mounted to the base front surface (121), wherein one or more additional brackets are disposed between the upper bracket (130) and the lower bracket (135).

\* \* \* \* \*